United States Patent Office 3,661,802
Patented May 9, 1972

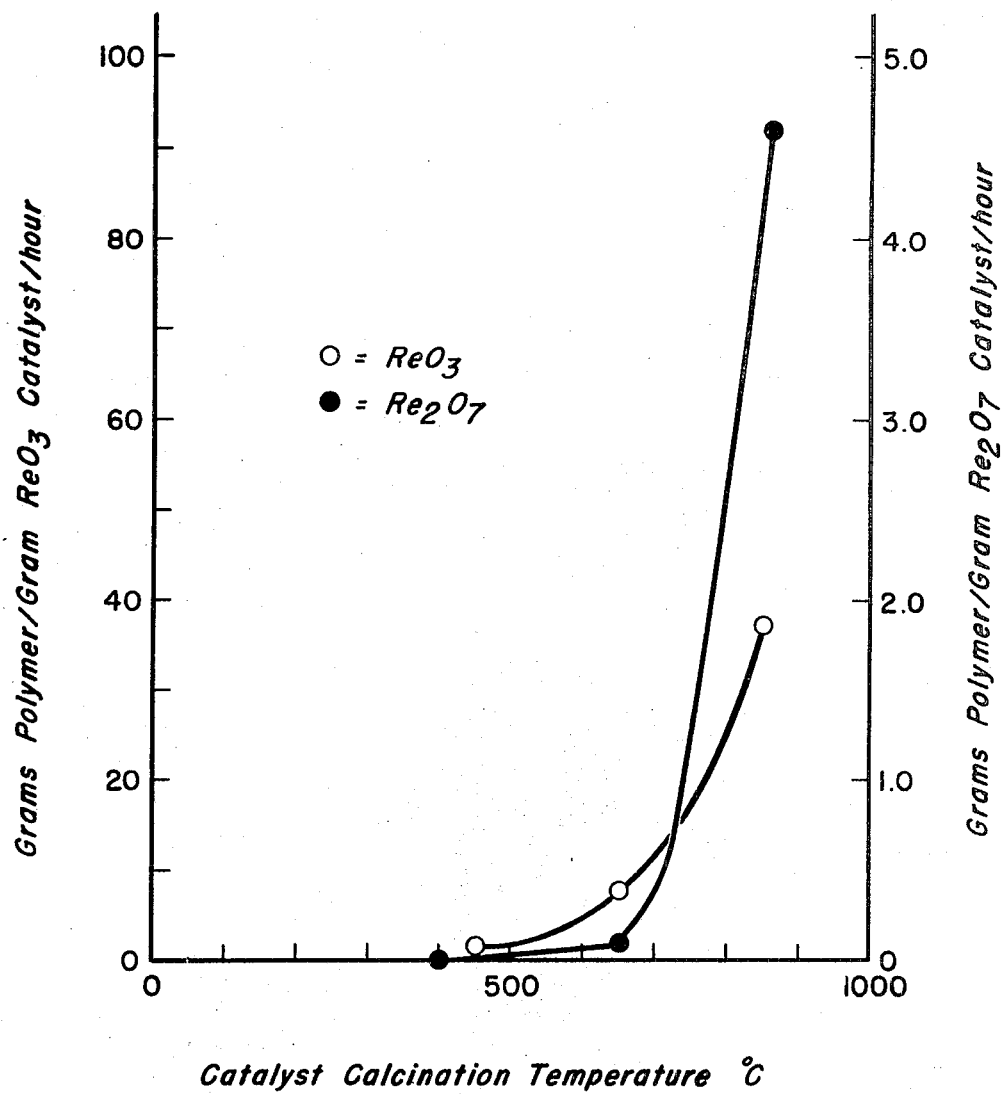

3,661,802
POLYMERIZATION CATALYSTS USING SUPPORTED RHENIUM OXIDES
Philip E. Nicpon, Hammond, Ind., assignor to Standard Oil Company, Chicago, Ill.
Filed Aug. 31, 1970, Ser. No. 68,197
Int. Cl. C08f 1/52
U.S. Cl. 252—430                               7 Claims

ABSTRACT OF THE DISCLOSURE

A composition of matter useful as a catalyst for the polymerization of mono- and diolefins to normally solid polymers which comprises a minor amount of a higher oxide of rhenium supported on a major amount of a high-surface-area silica, said oxide in combination with said silica, wherein said combination has been heated in the temperature range from about 400° C. to about 950° C., and a promoter chosen from the group containing compounds of formula $R_3Al$ wherein R is a lower alkyl group of from 1 to about 6 carbon atoms and wherein the mole ratio of said promoter to said higher oxide of rhenium runs from about 0.5 to about 50.

---

This invention relates to the polymerization of terminal vinyl olefins to produce normally solid polymers, and more particularly with providing an improved catalyst system for such polymerization.

In accordance with the invention, terminal vinyl olefin monomers are polymerized to normally solid polymers by effecting polymerization at high pressures and moderate temperatures with a catalyst system comprising (a) a higher oxide of rhenium supported on a high-surface-area substrate, the composite having been thermally activated, and (b) a promoter.

My novel rhenium oxide catalyst works only in conjunction with a high-surface-area substrate, such as silica, and only by calcining in the temperature range above about 600° C. but below the temperature where substantial decrease of surface area of the substrate occurs or where the oxide has appreciable volatility. Essential to the catalytic activity is the presence of a promoter such as a metal alkyl. With such a system as described above, the surprising result is obtained that the polymers thereby produced have molecular weights not far above values obtained by using supported chromia under comparable conditions. Empirical correlations obtained from other closely similar systems lead to the prediction that polymer molecular weights using a rhenium catalyst, as inferred from the viscosity measurements, would be substantially higher than those produced using the chromia.

The metal oxide component of my catalyst system should be a material wherein rhenium is in one of its higher oxidation states. By the term higher oxide of rhenium I mean rhenium heptoxide, rhenium trioxide or a mixture thereof. As may be seen from Table I, polymer yields under the same conditions are greater when supported $ReO_3$ is used than when supported $Re_2O_7$ is used. Intrinsic viscosities are also higher. Thus, it is within the contemplation of this invention that mixtures of higher rhenium oxides may be used to vary the molecular weight of the polymer produced. Any mixture from 0 percent $ReO_3$ and 100 percent $Re_2O_7$ to 100 percent $ReO_3$ and 0 percent $Re_2O_7$ may be used.

My oxide shows its greatest catalytic activity when it is supported on a high-surface-area silica. The silica usefully has a surface area of from about 50 to about 400 square meters per gram, preferably about 200 to about 350 square meters per gram prior to heating as measured by the BET low temperature isotherm method. Although it is desirable to employ pure silica for the base or support, the presence of minor amounts of alumina, zirconia, titania and like substances is not substantially deleterious. When the substrate is absent, the catalytic activity decreases and little or no polymer is formed.

The rhenium heptoxide catalyst made from silica is suitable when it contains from about 0.1 percent to about 30 percent by weight of rhenium oxide, preferably 1–15 percent. Silica-containing catalysts made from rhenium trioxide are useful over the range from about 1 percent to about 10 percent by weight rhenium oxide, preferably about 2 percent to about 8 percent.

The rhenium trioxide catalyst is prepared by ball-milling solid rhenium trioxide and inert support together until homogeneity is obtained. Other methods of deposition well-known in the art such as coprecipitation, deposition of rhenium compounds other than the oxide from solution followed by thermal decomposition to the oxide, and the like are also utilizable. Calcination at elevated temperatures is normally performed in air in an inert container such as one made of silica.

The rhenium heptoxide catalyst may be prepared as above except that the heptoxide or a compound containing heptavalent rhenium is substituted for the trioxide. Preferably, it is made by dry-mixing ammonium perrhenate, $NH_4Re_4$, in a Waring Blendor with water-saturated silica, and then heating under an air or pure oxygen flow to convert the perrhenate to the oxide. This latter heating may be combined with the critical calcination step described below.

A critical step in the process of preparing the catalyst is heating the rhenium-oxide-inert-support composite above a certain critical threshold temperature as shown by the data in the figure. Below about 600° C. little or no polymer is formed. Above the latter temperature the catalytic activity increases reaching a maximum where either the volatility of the oxide or a decrease in surface area of the catalyst begins to destroy the catalytic properties. As may be appreciated by one skilled in the art, the particular temperature where this occurs depends upon the chemical nature of the rhenium oxide and the particular substrate used as a support. Thus, the temperature above which the catalytic activity drops off varies for a particular rhenium-oxide-substrate combination. For the rhenium-oxide-silica catalyst system, the temperature where catalytic activity begins to drop off is about 950° C. to about 1,000° C. The preferred temperature range for heating the rhenium-oxide-silica combination is about 800° C. to about 900° C. for about 15 minutes preceded by a slow, one to two hours, warmup to this temperature range.

The catalytic activity of the rhenium oxide supported on silica is present (see Table 1) only when it is used in conjunction with a promoter such as aluminum alkyl. Triisobutylaluminum is very suitable for the purpose and produces useful polymer yields. The promoter is generally dissolved in a substantially inert solvent such as n-heptane. The ratio of solvent to aluminum alkyl is not critical and depends primarily upon convenience in charging the promoter into the reactor and upon the later polymerization conditions used. The solution of promoter in inert solvent is normally dilute and the weight of promoter chosen is such that the aluminum alkyl to rhenium oxide mole ratio is about 0.5 to about 50, preferably about 5 to about 25.

In general these novel compositions find their greatest current utility in the conversion of normally gaseous 1-alkenes, alone with suitable comonomers, to form solid polymers suitable for the uses of known commercial plastics.

Terminal vinyl olefin monomers which may be polymerized with our novel catalyst system to obtain normally solid polymers are monoolefins and diolefins having the formula RHC:CH$_2$, where R is hydrogen or an alkyl, alkenyl, or aryl group, or combinations of such groups. Preferred feedstocks are the terminal vinyl olefins containing from two to eight carbon atoms, inclusive, per molecule. Suitable feedstocks comprise ethylene, propylene, 1-butene, 1-pentene, 1-heptene, 1-octene, 1-dodecene, 1-tetradecene, 1-hexadecene or their mixtures and the like. Examples of isoalkyl ethylenes which can be used as components of polymerization feedstocks are 3-methylbutene, 4-methylpentene, 5-methylhexene or their mixture with each other or with normal 1-alkenes, and the like. Aryl olefins may also be used, and are exemplified by styrene, alpha-methyl styrene, and the like. Suitable diolefins include butadiene, piperylene, isoprene, etc. The alkene monomers can be co-polymerized with suitable polymerizable comonomers, for example, aryl ethylenes such as styrene, Ar-halostyrenes, Ar-alkylstyrenes and the like. Other suitable monomers comprise conjugated dienes such as butadiene, isoprene, chloroprene, piperylene, cyclopentadiene or the like. Other comonomers include tetrafluoroethylene, perfluorovinyl chloride or the like. Miscellaneous alkene charging stocks which can be polymerized by the process of the invention include norbornylene, 4-vinyl-cyclohhexene, vinyl cyclohexane or the like.

A substantially inert liquid reaction medium is desirably employed during the polymerization. This liquid is preferably a normally liquid saturated aliphatic or aromatic hydrocarbon but can be a relatively unreactive alkene (containing a non-terminal double bond) or in some instances, a cycloalkene, a perfluorocarbon, a chloroaromatic or mixtures of such suitable liquids. By "substantially inert liquid reaction medium," I mean liquids which do not substantially interfere with the reaction or deleteriously affect the resultant polymer.

POLYMERIZATION PROCEDURE

A typical polymerization procedure is described below. The heat-activated rhenium oxide catalyst is placed in a predried autoclave. Purified solvent, for example, 100 milliliters of n-heptane, is sucked into the evacuated reactor and about 40 p.s.i.g. of the monomer, if gaseous, is admitted to break the partial vacuum. Other solvents such as those defined above may be used or the reaction can be carried out in the absence of solvent. The autoclave is then opened and a solution of an aluminum alkyl dissolved in a convenient solvent is added. For example, a dilute solution of triisobutyl aluminum in n-heptane equivalent to a mole ratio of AlR$_3$ to rhenium oxide to about 10 is added. Monomer is then pressured into any desired value, preferably 10–10,000 p.s.i.g., and the reaction mixture is heated to the desired temperature for the desired length of time. At the end the reaction excess monomer is vented, and the polymer in the form of an unfused popcorn-like material is removed and separated from the catalyst. The results of a number of experiments is shown in Table 1.

The following examples show the preparation of the catalyst and its utilization for polymerization of ethylene monomer.

EXAMPLES

A mixture of 2.375 grams of a high-surface-area silica (about 350 square meters per gram) and 0.138 gram of ammonium perrhenate were slurried with water in a Waring Blendor and mixed thoroughly. The water was evaporated from the mixture at about 100° C. and the partially dry powder heated in a silica container over about 40 minutes to 850° C. and held at that temperature for about 15 minutes.

A 0.25 gram portion of the above heated material was charged into a predried autoclave and the autoclave evacuated. A 100 milliliter portion of n-heptane was sucked into the reactor and about 40 p.s.i.g. of ethylene was admitted to break the partial vacuum. The autoclave was then opened and 0.04 gram of triisobutylaluminum dissolved in a few milliliters of n-heptane was added. The autoclave was then pressurized with 600 p.s.i. of ethylene and temperature raised to about 88° C. during the reaction period of 4 hours. The autoclave was then cooled to room temperature, excess ethylene vented and solid polyethylene polymer of about 4–5 grams was removed.

In another erample, the same procedure as above was followed except as follows. The catalyst powder was made using rhenium trioxide and silica by ball-milling the dry mixture until homogeneity was assured. The mixture was then calcined by bringing it up to 850° C. over 105 minutes and holding at that temperature for 15 minutes. Additionally, a 20.6 mole ratio of triisobutylaluminum to rhenium trioxide was used, and the polymerization was carried out at temperatures up to 91° C. for 3.5 hours. With a 0.1 gram charge of solid catalyst, a 20.1 gram yield of solid polyethylene was obtained.

While my invention has been described in conjunction with specific examples, it is to be understood that these are for illustrative purposes only. Many alternatives, modifications, and variations will be apparent to those skilled in the art in light of the foregoing description, such alternatives, modifications, and variations falling within the spirit and scope of the appended claims.

Having thus described my invention, what I claim is:

1. As a composition of matter, a catalyst useful for the polymerization of mono- and diolefins to normally solid polymers, which comprises:
   (a) a minor amount of a higher oxide of rhenium supported on
   (b) a major amount of high-surface-area silica, said oxide in combination with said silica,
   (c) wherein said combination has been heated in the temperature range from about 400° C. to about 950° C., and
   (d) a promoter chosen from the group containing compounds of formula R$_3$Al wherein R is a lower alkyl group containing 1 to about 6 carbon atoms and

TABLE 1.—ETHYLENE POLYMERIZATION EMPLOYING RHENIUM OXIDES [1]

| Run | 90 | 122 | 123 | 186 | 164 | 181 | 182 | 188 |
|---|---|---|---|---|---|---|---|---|
| Catalyst: | | | | | | | | |
| (A) Unsupported ReO$_3$, grams | | 0.1000 | 0.1190 | | | | | |
| (B) 5% ReO$_3$/Cab-O-Sil,[2] grams | | | | 0.1000 | 0.1000 | 0.1000 | 0.4680 | 0.1000 |
| (C) 5% Re$_2$O$_7$/Cab-O-Sil, grams | 0.2500 | | | | | | | |
| Calcination temperature, °C | 850–75 | | | 450 | 650 | 850 | 850 | 850 |
| To reach temperature, minutes | 40 | | | 60 | 75 | 60 | 75 | 105 |
| Calcination time at temperature, minutes | 15 | | | 15 | 15 | 15 | 15 | 15 |
| Mole ratio, Al(iso Bu)$_3$/rhenium oxide | 10 | 2.6 | | 20.6 | 20.6 | 20.6 | | 20.6 |
| Reaction temperature, °C | [3] R.T.-88 | R.T.-88 | R.T.-88 | R.T.-32 | R.T.-38 | R.T.-38 | 75–113 | R.T.-91 |
| Reaction pressure, p.s.i.g. | 500–730 | 500–780 | 560–580 | 565–605 | 580–600 | 600–630 | 620–750 | 465–660 |
| Reaction time, hours | 4 | 2 | 1.5 | 2 | 2 | 2 | 2 | 3.5 |
| Polymer produced, grams | 4.55 | Trace | None | 0.3 | 1.5 | 7.4 | None | 20.1 |
| Yield, grams of polymer/gram of solid catalyst | 18.2 | | | 3.0 | 15.0 | 74.0 | | 201 |
| Yield, grams of polymer/gram of solid catalyst/hour | 4.55 | | | 1.5 | 7.5 | 37 | | 58 |
| Inherent viscosity [4] | 11.9 | | | | | 16.0 | | 18.7 |

[1] 100 ml. of n-heptane was employed in each run.
[2] Cab-O-Sil is silica with a surface area of about 350 square meters per gram.
[3] R.T. is room temperature.
[4] Measured in Decalin at 135° C.

wherein the mole ratio of said promoter to said higher oxide of rhenium runs from about 0.5 to about 50.

2. The composition of claim 1 wherein the higher oxide of rhenium is rhenium trioxide or rhenium heptoxide.

3. The composition of claim 2 wherein the rhenium trioxide content prior to heating is about 2–8 percent by weight, and the rhenium heptoxide content prior to heating is about 1–15 percent by weight.

4. The composition of claim 3 wherein the promoter is triisobutylaluminum and wherein the mole ratio of said triisobutylaluminum promoter to rhenium oxide comcomponent runs from about 5 to about 25.

5. The composition of claim 4 wherein said combination has been heated by slowly raising the temperature to from about 600° C. to about 900° C. over a period of about 1 to 2 hours and then holding the combination at the temperature attained for about 5 to about 25 minutes.

6. The composition of claim 1 wherein the silica substrate has a surface area from about 50 to about 350 square meters per gram prior to heating.

7. The composition of claim 1 wherein the mole ratio of promoter to rhenium oxide runs from about 5 to about 25.

References Cited
UNITED STATES PATENTS

| | | | |
|---|---|---|---|
| 2,963,447 | 12/1960 | Peters et al. | 252—430 |
| 3,223,690 | 12/1965 | Wilsher et al. | 252—430 X |
| 3,354,235 | 11/1967 | Hogan et al. | 252—430 X |

PATRICK P. GARVIN, Primary Examiner

U.S. Cl. X.R.

260—93.5, 93.7, 94.9 D, 94.3

UNITED STATES PATENT OFFICE
CERTIFICATE OF CORRECTION

Patent No. 3661802        Dated May 9, 1972

Inventor(s) PHILIP E. NICPON

It is certified that error appears in the above-identified patent and that said Letters Patent are hereby corrected as shown below:

Column 2, line 27, "$NH_4Re_4$," should be --$NH_4ReO_4$,--; line 63, "pormoter" should be --promoter--; line 68, "alone with suitable comonomers," should be --alone or with suitable comonomers,--. Column 3, line 19, "monomers" should be --comonomers--; line 50, "to about 10" should be --of about 10--. Column 5, line 11, "com-" should be deleted before "component".

Signed and sealed this 19th day of September 1972.

(SEAL)
Attest:

EDWARD M. FLETCHER, JR.
Attesting Officer

ROBERT GOTTSCHALK
Commissioner of Patents